US008518331B2

(12) United States Patent
Minehara

(10) Patent No.: US 8,518,331 B2
(45) Date of Patent: Aug. 27, 2013

(54) APPARATUS FOR DECONTAMINATING RADIOISOTOPE-CONTAMINATED SURFACE VICINITY REGION BY USE OF NONTHERMAL LASER PEELING

(75) Inventor: Eisuke Minehara, Ibaraki (JP)

(73) Assignees: Japan Atomic Energy Agency, Ibaraki (JP); The Japan Atomic Power Company, Tokyo (JP)

( * ) Notice: Subject to any disclaimer, the term of this patent is extended or adjusted under 35 U.S.C. 154(b) by 39 days.

(21) Appl. No.: 13/330,101

(22) Filed: Dec. 19, 2011

(65) Prior Publication Data

US 2012/0085376 A1    Apr. 12, 2012

Related U.S. Application Data

(62) Division of application No. 12/086,387, filed as application No. PCT/JP2007/060872 on May 29, 2007, now Pat. No. 8,097,765.

(30) Foreign Application Priority Data

May 29, 2006  (JP) ................. 2006-147918

(51) Int. Cl.
*G21C 1/00*    (2006.01)
(52) U.S. Cl.
USPC .......................................... 422/159; 588/900
(58) Field of Classification Search
USPC .................... 422/159; 588/1, 18, 19, 20, 900
See application file for complete search history.

(56) References Cited

U.S. PATENT DOCUMENTS

| 6,970,483 B2 | 11/2005 | Minehara et al. |
| 2006/0048867 A1 | 3/2006 | Minehara et al. |

FOREIGN PATENT DOCUMENTS

| JP | 56-38899 | 4/1981 |
| JP | 8-94796 | 4/1996 |
| JP | 9-281296 | 10/1997 |
| JP | 2000-346992 | 12/2000 |
| JP | 2001-116892 | 4/2001 |
| JP | 2003-17788 | 1/2003 |
| JP | 2006-61966 | 3/2006 |

OTHER PUBLICATIONS

International Search Report mailed Jul. 24, 2007 in connection with International Application No. PCT/JP2007/060872.
Minehara Eisuke J., "Jaeri Fel Applications in Nuclear Energy Industries", Jaeri-Conf 2005-004, pp. 48-52, 2005.
Japanese Office Action issued Sep. 7, 2010 in corresponding Japanese Patent Application 2006-147918.
Restriction Requirement mailed from the Unites States Patent and Trademark Office on Mar. 17, 2011 in the related U.S. Appl. No. 12/086,387.
Notice of Allowance mailed from the Unites States Patent and Trademark Office on Sep. 19, 2011 in the related U.S. Appl. No. 12/086,387.
U.S. Appl. No. 12/086,387, filed Jun. 12, 2008, Eisuke Minehara, Japan Atomic Energy Agency and the Japan Atomic Power Company.

*Primary Examiner* — Edward Johnson

(57) ABSTRACT

An apparatus with which areas near surfaces in a water environment that are contaminated by radioisotopes are decontaminated by non-thermal laser peeling without suffering re-melting, re-diffusing and re-contaminating. The apparatus includes a piping structure with which a substance to be irradiated that has been deposited on outer and inner surfaces of a nuclear reactor pressure vessel, and a nuclear reactor container tank, and the internal nuclear reactor structures all having been contaminated with radioisotopes, can be removed in the water environment. The piping structure, to secure a region in a water environment that is gas pressurized to discharge the water and filled with the gas to not interfere with laser irradiation, has a semi-hermetically closed, incomplete water seal that is half-open with a siphon provided downward, a mechanical structure that withstands water pressure in a radial direction, and an extendable bellows-like tube to enable the piping structure to tilt.

2 Claims, 2 Drawing Sheets

APPARATUS FOR DECONTAMINATING RADIOISOTOPE-CONTAMINATED SURFACE VICINITY REGION BY USE OF NONTHERMAL LASER PEELING

CROSS-REFERENCE TO RELATED APPLICATIONS

This application is a U.S. divisional application filed under 37 C.F.R. 1.53(b) claiming priority benefit of U.S. application Ser. No. 12/086,387, filed Jun. 12, 2008 now U.S. Pat. No. 8,097,765, allowed. This application also claims the benefit under 35 U.S.C. Section 371, of International Application No. PCT/JP2007/060872, filed May 29, 2007, which claimed priority to Japanese Application No. 2006-147918, filed May 29, 2006 in Japan, the contents of which are incorporated herein by reference.

BACKGROUND

1. Field

This invention relates to a method by which areas near the surfaces of apparatuses that are contaminated by many kinds of radioisotopes as the result of handling many radioisotopes in the neighborhood of accelerators, nuclear reactors, RI product manufacturing factories, nuclear fuel factories, nuclear fuel reprocessing factories, etc. are decontaminated by non-thermal laser peeling without suffering re-melting, re-diffusing or re-contaminating, and an apparatus used in that method. When a substance is irradiated with pulsed laser the pulse duration of which is extremely short, ranging from several hundred femtoseconds to less than several picoseconds, it is evaporated or removed from the irradiated region at a sufficiently faster speed than the energy dissipation of the laser, and the energy dissipation of laser-induced, laser-accelerated or laser-energized electrons and other particles, and the thermal effects of these energy dissipations are transmitted from the irradiated region to nearby areas; this phenomenon is called "non-thermal laser peeling."

2. Description of the Related Art

Conventionally, the areas near the surfaces of apparatuses and the industrial products that are contaminated by radioisotopes are decontaminated by the following methods.

(1) The surface is physically or mechanically removed by sand blasting, grinder, surface polishing tool, and the like.
(2) The surface-deposited layer contaminated by radioisotopes is chemically corroded away with a chemical agent such as a chelating agent or an acid.
(3) The surface-deposited layer containing radioisotopes is irradiated with a continuous laser, a long-pulse laser or a short-pulse laser having a pulse duration with a period sufficiently longer than 10 picoseconds, so that it is melted or thermally evaporated.
(4) The surface-deposited layer contaminated by radioisotopes is immersed in an electrochemical etchant for electrochemical polishing.
(5) The surface-deposited layer contaminated by radioisotopes is irradiated with laser in a chlorine gas atmosphere so that the contaminants in oxide form on the metal surface are converted to a volatile or water-soluble chloride, which is then removed.
(6) The surface-deposited layer contaminated by radioisotopes is coated with a gel-decontamination agent and irradiated with laser, so that the contaminants are removed by the laser-induced chemical reaction.
(7) The surface-deposited layer contaminated by radioisotopes is physically or mechanically removed by a kind of cold-working processes which uses a water jet, with or without ceramic or metal (cast iron or iron) abrasive particles, in either a gas or water environment.

SUMMARY

The above-described methods of removing the surface-deposited layer contaminated by radioisotopes have proven record and are extensively used; however, due to the rigorous applicability conditions of those methods in such terms as the substance to be treated, the area and the shape, the scope of their applicability is quite limited; in addition, 100% decontamination is not guaranteed and in spite of more than 50% that can be decontaminated, a greater part of the deposited radioisotopes remain unremoved; on account of this limited decontamination performance, the conventional methods have the following problems.

The physical or mechanical methods of removing the surface-deposited layer contaminated by radioisotopes are essentially cold-working processes and in the process of removal, both the surfaces of the surface-deposited layer and the structural component as well as the surfaces of the particles contacted by sand blast particles, grinder, surface polishing tool or the like, the surface of the cutting edge, and the surface of the tool are locally heated to a thousand and several hundred degrees Celsius or higher, and cracks are mechanically generated to develop during the removing operation. As a result, the radioisotopes in the surface-deposited layer locally re-melt, and re-diffuse on the surface of the structural member or re-contaminate it, thus making it difficult to achieve perfect decontamination.

The surface of the member structure underlying the surface-deposited layer usually finds itself as having been unavoidably cold-worked during manufacturing, with the resulting concentration of crack susceptibility and residual tensile force; hence, cracking has already developed in the manufacturing process or during machine operation prior to decontamination and, under a light-water corrosive environment, stress corrosion cracking will develop over many years from the crack susceptible surface, causing the radioisotopes to advance into deeper regions along the cracks. Under a strong corrosive environment that is brought about by chemical agents such as acids used in decontamination, the stress corrosion cracking will develop within an even shorter time, again causing the radioisotopes to advance into a wider and deeper region along the crack. As a result, like those in the surface-deposited layer, the radioisotopes on the surface of the member structure underlying the surface-deposited layer are directly transported into the bulk, where they permeate or diffuse to cause re-contaminating, thereby making it difficult to achieve perfect decontamination.

Under these circumstances, the present invention has as its object providing a method of decontamination by non-thermal laser peeling, that is free from the potential failure to remove the radioisotopes that have already penetrated and diffused through and contaminated a deep and wide area due, for example, to stress corrosion cracking and the like in the manufacturing process or during machine operation before decontamination, that is free from the potential penetration and diffusion of and re-contamination by radioisotopes on account of the crack development by stress corrosion cracking of the cold-worked damage of the surface from chemical agents such as acids that are used in decontamination, that is substantially free of limitations on the intended environment, effectiveness, subject matter, intended area and any other applicability conditions, and which hence realizes a decontamination factor much higher than has been attained by the conventional decontamination methods, almost 100% decontamination, in an easy and economical manner, whereby the penetration and diffusion of the radioisotopes during decontamination is prevented to eliminate or to minimize the possibility of re-contamination.

The "method of decontaminating radioisotope-contaminated surface vicinity region by use of non-thermal laser peeling without re-melting, without re-diffusion and without re-contamination, and apparatus therefor" according to the present invention are characterized in that parts, structural components, etc. that have their surfaces contaminated by radioisotopes in the neighborhood of accelerators, nuclear reactors, RI product manufacturing factories, nuclear fuel factories, nuclear fuel reprocessing factories, etc. are decontaminated by non-thermal laser peeling without suffering re-melting, re-diffusing or re-contaminating in such a way that upon non-thermal laser irradiation, areas near the irradiated surface are evaporated and removed faster than the heat generated in the neighborhood of the irradiated surface is transmitted to nearby areas.

As described above, according to this invention, a high decontamination factor that has been impossible in the prior art is realized to enable almost perfect decontamination that leaves no residual radioisotopes other than the base material becoming radioactive; in other words, decontamination by non-thermal laser peeling enables areas near the irradiated surface to be decontaminated without potential re-melting, re-diffusing and re-contaminating. In addition, this invention offers the following significant effects that are unique to it.

(1) According to this invention, decontamination can be easily performed without physical or mechanical procedures using sand blasting, grinder, surface polishing tool or the like, either by hand or by means of automatic tools.
(2) According to this invention, decontamination can be easily performed without using any chemical corroding agents such as chelating agent and acid.
(3) According to this invention, decontamination can be easily performed without converting the contaminants in oxide form on the metal surface to a volatile or water-soluble chloride and halogenide by laser irradiation in a halogen gas atmosphere that is highly corrosive to the environment and that is so toxic and harmful that it has to be stored or otherwise handled with utmost care.
(4) According to this invention, decontamination can be easily performed without an electro-chemical procedure using an electro-chemical etchant and an electro-chemical polishing apparatus.
(5) According to this invention, decontamination can be easily performed without suffering re-melting, re-diffusing and, hence, re-contaminating that is unavoidable in the method of irradiating the surface-deposited layer containing radioisotopes with a continuous laser, a long-pulse laser or a short-pulse laser having a period sufficiently longer than 10 picoseconds, so that it is melted and thermally evaporated.
(6) According to this invention, decontamination can be easily performed without physically or mechanically removing the radioisotope-contaminated surface-deposited layer by a kind of cold-working which uses a water jet, with or without ceramic or cast iron abrasive particles, in either a gas or water environment.
(7) According to this invention, aside from the limitation posed by the nature as radioactive waste, there are no limitations in such aspects as the weight, shape and chemical properties of the substance to be treated, the ambient atmosphere, the ambient environment, and the working area and, hence, decontamination can be performed over a large area in an easy, economical and safe manner.
(8) According to this invention, the post-decontamination radiation dose rate is reduced to the lowest level that can be expected in decontamination and, hence, most of the radioactive wastes that have heretofore been disposed of as radioactive waste since they cannot be completely freed of surface contamination despite the comparatively low radioactive level of the base material, can be recycled for further use as non-radioactive industrial waste.

BRIEF DESCRIPTION OF THE DRAWINGS

The above object and features of the present invention will be more apparent from the following description of some preferred embodiments with reference to the accompanying drawings, wherein.

DESCRIPTION OF EMBODIMENTS

Figure 1:
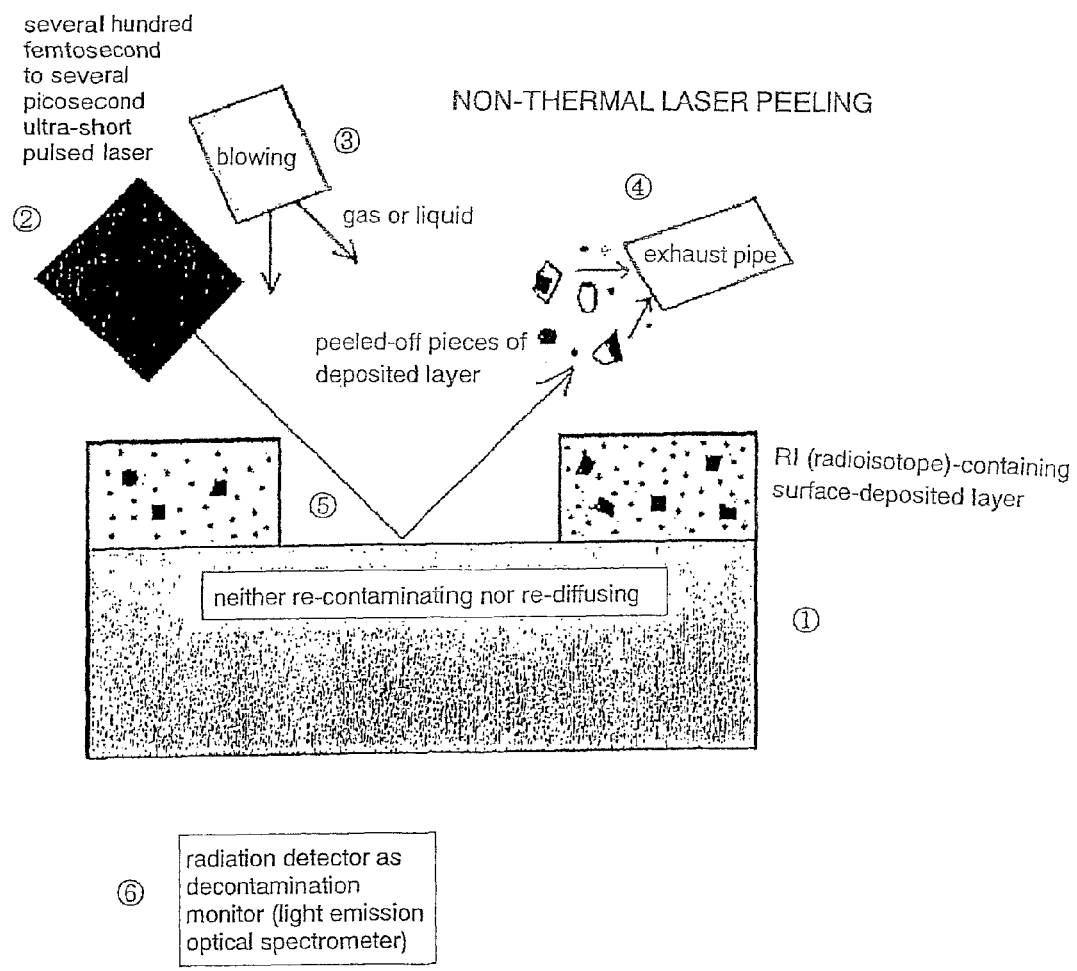
FIG. 1 illustrates how an RI-containing surface-deposited layer is peeled off by a non-thermal laser in a gas environment.

[FIG. 1]
1: stainless steel-made non-radioactive structural component
2: several hundred femtosecond to several picosecond, ultra-short pulsed non-thermal laser
3: nozzle for blowing a fluid such as highly pressurized, carrying gas and liquid
4: exhaust pipe for inhaling peeled-off pieces of the surface-deposited layer
5: stainless steel-made interface that is free of a molten portion, as well as re-contaminating and re-diffusing
6: light emission optical spectrometer or radiation detector for monitoring the decontamination factor.

Figure 2:
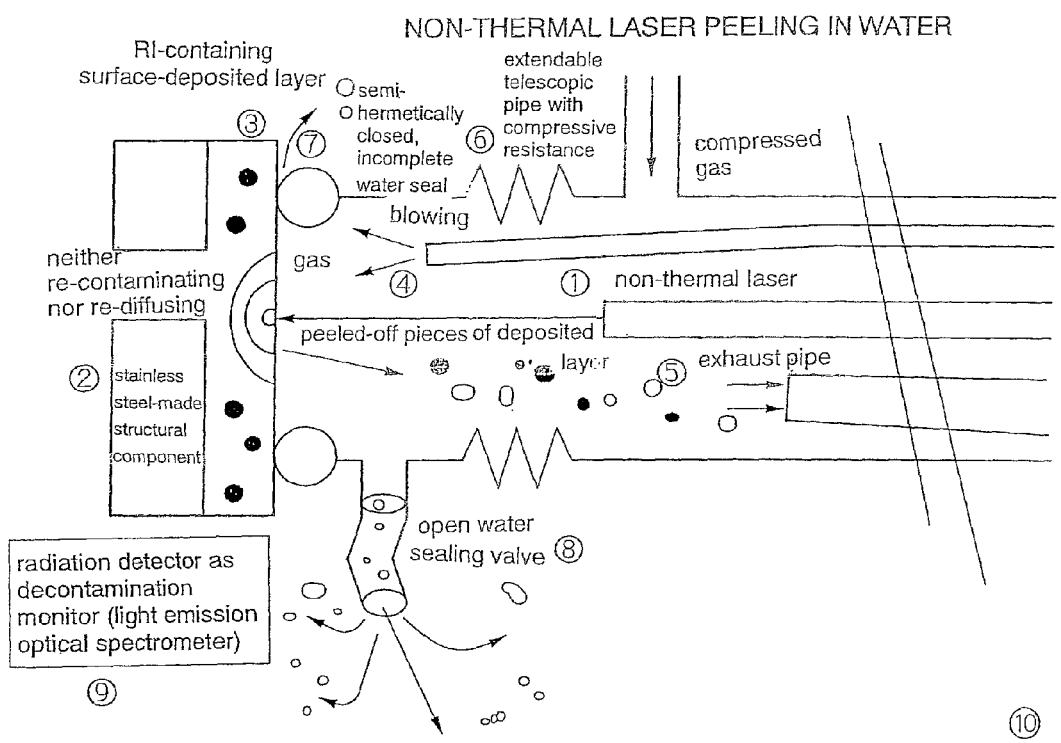
FIG. 2 illustrates a method of decontamination by non-thermal surface peeling, in which an RI-containing surface-deposited layer is irradiated with a non-thermal laser in a water environment so that it is removed by non-thermal evaporation faster than heat transfer, followed by blowing a fluid such as a gas so that the peeled-off pieces of the deposited surface layer are inhaled through an exhaust pipe.

[FIG. 2]
1: non-thermal laser
2: stainless steel structural component
3: RI-containing, surface-deposited layer
4: carrying fluid and a blow-off pipe for RI-removal
5: exhaust pipe for inhaling peeled-off pieces of the RI-containing, surface-deposited layer
6: extendable telescopic pipe with compressive resistance
7: semi-hermetically closed, incomplete water seal
8: open water-sealing valve
9: decontamination monitoring light emission optical spectrometer or radiation detector
10: water environment Using a superconducting linac-driver free-electron laser unit which is the only available several hundred femtoseconds to less than several picosecond, ultra-short pulsed kW class high average power laser that can deliver the highest average power of at least the kW class, irradiation is conducted as shown in FIG. 1 to effect non-thermal peeling, whereby decontamination is achieved without re-melting, re-diffusing and re-contaminating.

To be more specific, a layer containing RI (radioisotopes) that had been deposited on the surface of a stainless steel-made non-radioactive structural component 1 was irradiated with an ultra-short pulsed non-thermal laser 2 having a pulse duration ranging from several hundred femtoseconds to less than several picoseconds, whereupon the surface-deposited layer was excised. Simultaneously, an carrying fluid 3 in either a gas or fluid form was blown against the laser irradiated area to peel the excised pieces of the deposited layer, which were removed by being inhaled through an exhaust pipe 4. The degree of decontamination by peeling was monitored with a light emission optical spectrometer or a radiation detector 6 to ensure that the stainless gamma ray or X ray steel-made interface 5 which was the substance to be decontaminated was free from molten areas and, hence, from re-contaminating and re-diffusing.

As shown in FIG. 2, by irradiation with a non-thermal laser in a water environment, the RI-containing surface-deposited layer was subjected to removal through non-thermal evaporation, in which it was evaporated and removed at a faster rate than the heat generated near the surface due to laser irradiation was transferred to the neighborhood. A fluid such as a gas was blown against the irradiated area so that the peeled-off pieces of the deposited layer were efficiently inhaled through the exhaust pipe, whereupon they were non-thermally peeled from the area near the surface to achieve decontamination.

To be more specific, a piping structure furnished with a compressed gas introduction system, an open water-sealing valve 8, an extendable telescopic pipe with compressive resistance, 6 and a semi-hermetically closed, incomplete water seal, 7 was pressed against an RI (radioisotope)-containing layer 3 deposited on the surface of a stainless steel-made non-radioactive structural component 2 via the water-sealing valve by adjusting the extendable telescopic pipe with compressive resistance. In the next step, a compressed gas was introduced into the piping structure through the compressed gas introduction system and the water in the compressed gas introduction system was discharged through the open water-sealing valve 8 so that the interior of the piping structure was filled with the compressed gas to form an area filled with the compressed gas. Thereafter, the RI (radioisotope) containing layer 3 that had been deposited on the surface of the stainless steel-made non-radioactive structural component 2 was irradiated with an ultra-short pulsed non-thermal laser 1 having a pulse duration ranging from several hundred femtoseconds to less than several picoseconds, whereupon the surface-deposited layer was fractured. Simultaneously, a carrying fluid 4 was blown against the laser irradiated area to peel the fractured pieces of the deposited layer, which were removed by being inhaled through an exhaust pipe 5. The degree of decontamination by peeling was monitored with a radiation detector 9 to ensure that the stainless steel-made interface which was the substance to be decontaminated was free from re-contaminating and re-diffusing.

If desired, non-normal incidence irradiation may be performed such that a non-thermal laser is applied at a shallow angle (closer to the horizontal) with respect to the surface to be peeled, so that the peeled substance will recoil in a greatly different direction than laser incidence; this ensures that the residue left after peeling by laser irradiation can easily be removed automatically as it recoils and that the hot recoiled residue will not build up on the irradiated surface. The exhaust pipe is provided in a nearby area such as to facilitate the removal of the peeled substance, which is inhaled through the pipe.

In order to ensure that the comparatively warm residue or irradiated surface will not react with the oxygen in the air to generate intense heat, an inert gas such as a inert gas among fluids may be jetted to shield the air from the irradiated surface so that temperature elevation is prevented while, at the same time, the residue is blown off from the irradiated surface by means of the fluid jet and removed at high speed.

In order to facilitate the irradiation and the isolation by the fluid, the flow of the fluid is preferably made coaxial with or in a generally identical direction to the direction of laser irradiation. In addition, to ensure that the flow of the fluid will not be disturbed, thereby helping it cover the irradiated surface smoothly, the whole assembly comprising the irradiated surface, the laser unit, the fluid blow-off orifice and the like may be shielded by a cylindrical isolator or any other suitable means such as an isolating fluid jet.

Further in addition, the fluid jet may be expanded adiabatically and used as an atomized jet of a liquefied gas or, alternatively, a mixture of a different atomized fluid and a gas may be used to realize not only an ultrasonic or high-speed jet that permits easy removal of the residue but also cooling of the irradiated surface and effective air shielding.

What is claimed is:

1. An apparatus with which areas near surfaces in a water environment that are contaminated by radioisotopes are decontaminated by non-thermal laser peeling without suffering re-melting, re-diffusing and re-contaminating, the apparatus comprising:
    a piping structure with which a substance to be irradiated that has been deposited either on both the outer and inner surfaces of a nuclear reactor pressure vessel, and a nuclear reactor container tank, and the internal nuclear reactor structures and the like, all having been contaminated with radioisotopes, can be removed in the water environment, the piping structure being such that in order to secure a region in a water environment that is gas pressurized to discharge the water and filled with the gas so that it will not interfere with laser irradiation, it has a semi-hermetically closed, incomplete water seal that is half-open with a siphon provided downward, has a mechanical structure that withstands water pressure in a radial direction, and has an extendable bellows-like tube or any other extendable telescopic structure that enables the piping structure to be tilted over a wide range in an axial direction that is generally perpendicular to the surface to be irradiated with the laser.

2. The apparatus according to claim 1, further comprising a radiation detector or a light emission optical spectrometer to monitor the decontamination process in the neighborhood of either the area being removed by non-thermal laser peeling or the area where the radioisotopes separately recovered through an exhaust pipe are piled-up after the removal by non-thermal laser peeling.

\* \* \* \* \*